United States Patent
Lee et al.

(10) Patent No.: US 10,037,726 B2
(45) Date of Patent: Jul. 31, 2018

(54) DETECTING METHOD OF SUBSTANDARD STATE AND DISPLAY MODULE AND ELECTRONIC DEVICE OPERATING THE SAME

(71) Applicant: SAMSUNG ELECTRONICS CO., LTD., Suwon-si, Gyeonggi-do (KR)

(72) Inventors: Joon Gyu Lee, Ansan-si (KR); Jae Wan Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/050,830

(22) Filed: Feb. 23, 2016

(65) Prior Publication Data

US 2016/0247436 A1 Aug. 25, 2016

(30) Foreign Application Priority Data

Feb. 23, 2015 (KR) .................. 10-2015-0024956

(51) Int. Cl.
*G09G 3/20* (2006.01)
*G09G 3/00* (2006.01)
*G02F 1/1362* (2006.01)

(52) U.S. Cl.
CPC .......... *G09G 3/2003* (2013.01); *G09G 3/006* (2013.01); *G02F 2001/136254* (2013.01); *G09G 2300/0426* (2013.01); *G09G 2330/12* (2013.01)

(58) Field of Classification Search
CPC .......... G02F 2001/136254; G09G 2300/0426; G09G 2330/12
See application file for complete search history.

(56) References Cited

U.S. PATENT DOCUMENTS

| 7,956,946 B2 | 6/2011 | Yang et al. |
| 8,704,762 B2 | 4/2014 | Anno et al. |
| 2007/0040794 A1 | 2/2007 | Kwak et al. |
| 2008/0007683 A1* | 1/2008 | Makida ............... G02F 1/13452 349/139 |

(Continued)

FOREIGN PATENT DOCUMENTS

| CN | 1916700 A | 2/2007 |
| CN | 101093846 A | 12/2007 |

(Continued)

OTHER PUBLICATIONS

Partial Search Report dated Jun. 20, 2016 in counterpart European Application No. 16157016.3.

(Continued)

*Primary Examiner* — Benjamin C Lee
*Assistant Examiner* — Chun-Nan Lin
(74) *Attorney, Agent, or Firm* — Nixon & Vanderhye P.C.

(57) ABSTRACT

A display module is provided. The display module includes a display area which includes a plurality of pixels, a plurality of first conductive lines, and a plurality of second conductive lines intersecting the first conductive lines, a non-display area at least partially surrounding the display area, test circuitry electrically connected with the first conductive lines, and a third conductive line electrically connected between one of the first conductive lines and the test circuitry. The third conductive line may include a portion disposed in the non-display area and extending along a periphery of the display area.

12 Claims, 9 Drawing Sheets

(56) References Cited

U.S. PATENT DOCUMENTS

| | | | |
|---|---|---|---|
| 2009/0167976 A1 | 7/2009 | Chung et al. | |
| 2010/0171520 A1* | 7/2010 | Yang | G09G 3/006 324/760.01 |
| 2011/0149172 A1 | 6/2011 | Tsubata | |
| 2012/0112199 A1 | 5/2012 | Son et al. | |
| 2012/0139829 A1 | 6/2012 | Anno et al. | |
| 2014/0225849 A1 | 8/2014 | Anno et al. | |
| 2014/0368228 A1 | 12/2014 | Kim | |
| 2015/0242022 A1* | 8/2015 | Hung | G06F 1/1615 345/174 |

FOREIGN PATENT DOCUMENTS

| | | |
|---|---|---|
| CN | 101216643 A | 7/2008 |
| CN | 102132203 A | 7/2011 |
| JP | 2011-253359 | 12/2011 |

OTHER PUBLICATIONS

EP Search Report for EP Application No. 16157016.3 dated Sep. 30, 2016.

Chinese Office Action dated Jun. 13, 2018 for CN Application No. 201610099260.8.

* cited by examiner

DETECTING METHOD OF SUBSTANDARD STATE AND DISPLAY MODULE AND ELECTRONIC DEVICE OPERATING THE SAME

CROSS-REFERENCE TO RELATED APPLICATION

This application is based on and claims priority under 35 U.S.C. § 119 to a Korean patent application filed on Feb. 23, 2015 in the Korean Intellectual Property Office and assigned Serial number 10-2015-0024956, the disclosure of which is incorporated by reference herein in its entirety.

TECHNICAL FIELD

The present disclosure relates to detecting a substandard state of an electronic device.

BACKGROUND

Various electronic devices are equipped with display modules of various sizes and shapes and provide a variety of contents through a screen more naturally and dynamically thanks to the development of display technologies.

Since a miniaturization display technique had been applied to an electronic device, a minor substandard state may cause a critical defect. For example, in a conventional electronic device, a minor substandard state which is not detected in the manufacturing process causes a partial damage or malfunction. Such a situation adversely affects the reliability of product.

SUMMARY

Aspects of the present disclosure address at least the above-mentioned problems and/or disadvantages. Accordingly, an aspect of the present disclosure is to provide a substandard state detection method which makes it possible to detect a substandard state occurring at an electronic device more accurately and a display module and an electronic device for operating the same.

In accordance with an aspect of the present disclosure, an example display module may include a display area including a plurality of pixels, a plurality of first conductive lines, and a plurality of second conductive lines intersecting the first conductive lines, a non-display area surrounding at least a portion of the display area, circuitry electrically connected to the first conductive lines, and a third conductive line electrically connected between one of the first conductive lines and the circuitry. The third conductive line may include a portion disposed in the non-display area and extending along a periphery of the display area.

In accordance with another aspect of the present disclosure, an example electronic device may include an electronic device housing, a display module exposed through an opening in at least one side of the electronic device housing, and a processor disposed in the housing and electrically connected to the display module. The display module may include a display area including a plurality of pixels, a plurality of first conductive lines, a plurality of second conductive lines intersecting the first conductive lines, a non-display area surrounding at least a portion of the display area, circuitry electrically connected to the first conductive lines, and a third conductive line electrically connected between one of the first conductive lines and the circuitry. The third conductive line may include a portion disposed in the non-display area and extending along a periphery of the display area.

In accordance with still another aspect of the present disclosure, an example substandard state detecting method in a device including a display module having a display area including a plurality of pixels, a plurality of first conductive lines, a plurality of second conductive lines intersecting the first conductive lines, a non-display area surrounding at least a portion of the display area, circuitry electrically connected to the first conductive lines, and a third conductive line electrically connected between one of the first conductive lines and the circuitry, wherein the third conductive line may include a portion disposed in the non-display area and extending along a periphery of the display area, the method may include alternately performing an operation to supply a first signal through the third conductive line, and an operation to supply a second signal to surrounding lines, and determining whether a display state expressed by a first conductive line to which the third conductive line is connected is different from a display state expressed by surrounding lines.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages will become more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
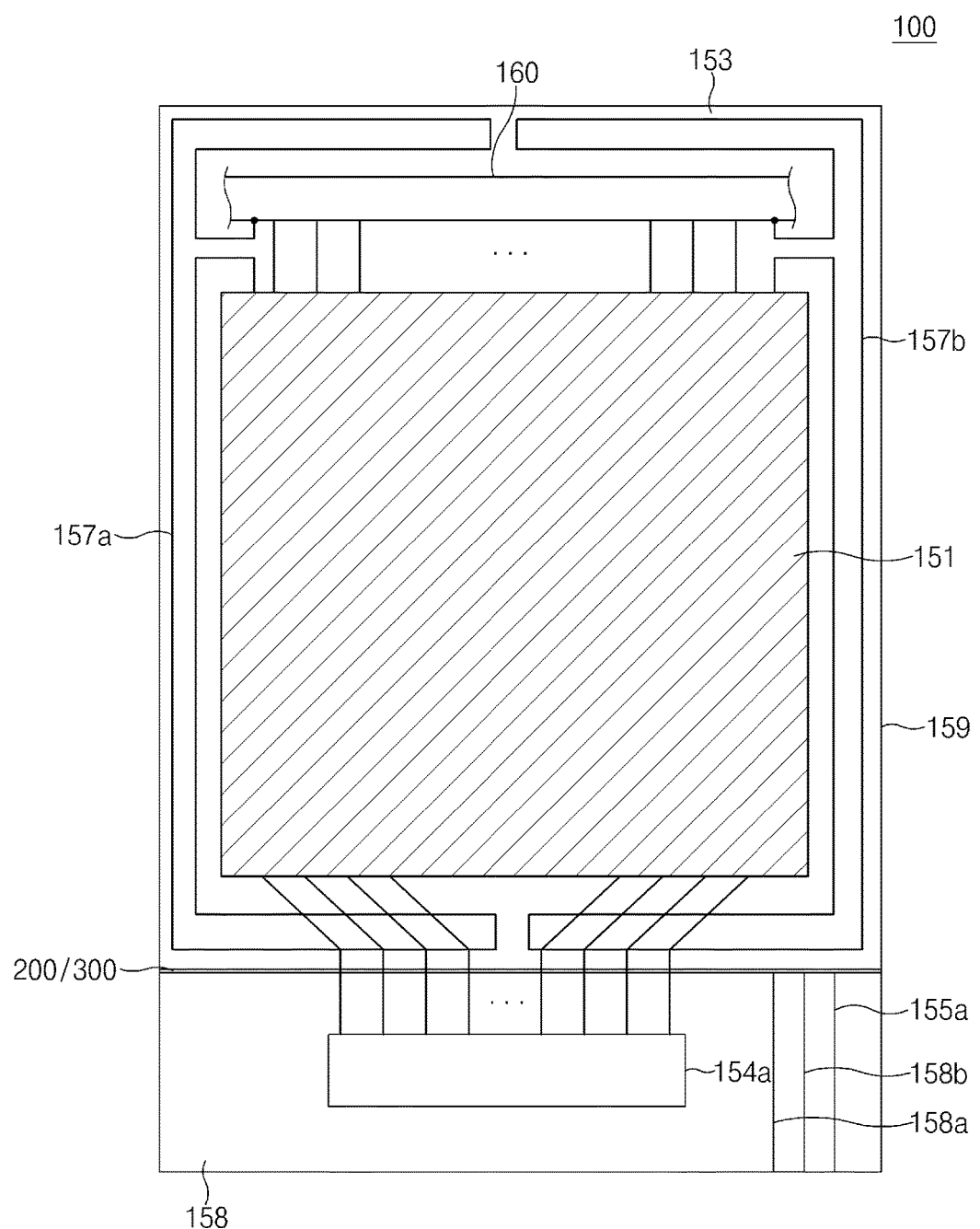
FIG. 1 is a diagram illustrating an example display module according to various example embodiments of the present disclosure.

Various example embodiments of the present disclosure may be described with reference to accompanying drawings. Accordingly, those of ordinary skill in the art will recognize that modification, equivalent, and/or alternative on the various example embodiments described herein can be variously made without departing from the scope and spirit of the present disclosure. With regard to description of drawings, similar components may be marked by similar reference numerals.

In the disclosure, the expressions "have", "may have", "include" and "comprise", or "may include" and "may comprise" may be used herein to indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various example embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

Based on context, the expression "configured to" used herein may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. CPU, for example, a "processor configured to perform A, B, and C" may, for example, to mean a dedicated processor (e.g., an embedded processor) for performing a corresponding operation or a general-purpose processor (e.g., a central processing unit (CPU) or an application processor) which may perform corresponding operations by executing one or more software programs which are stored in a memory device.

Terms used in this disclosure are used to describe example embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined herein in various example embodiments of the present disclosure. In some cases, even if terms are terms which are defined in the disclosure, they may not be interpreted to exclude embodiments of the present disclosure.

An electronic device according to various example embodiments may include at least one of, for example, a smartphone, a tablet personal computer (PC), a mobile phone, a mobile medical appliance, a camera, or a wearable device, or the like. According to various example embodiments, the electronic device may be one of the above-described devices or a combination thereof. An electronic device according to an example embodiment may be a flexible electronic device. Furthermore, an electronic device according to an example embodiment may not be limited to the above-described electronic devices and may include other electronic devices and new electronic devices according to the development of technologies.

Hereinafter, electronic devices according to an example embodiment of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an example display module according to various example embodiments of the present disclosure.

Referring to FIG. 1, a display module 100 according to various example embodiments of the present disclosure may include a first substrate 159 (e.g., a lower substrate), a sealing substrate 200, and a protection film 300. The display module 100 may include a display area 151 and a non-display area 153.

The first substrate 159 may be a substrate on which the display area 151 is at least formed and may be formed of various materials such as glass, film, and the like. According to various example embodiments, a flexible display may be implemented by forming the first substrate 159 using a flexible material such as a flexible film or the like. In FIG. 1, an example embodiment of the present disclosure is exemplified as the display area 151 is disposed, for example, at least at the center of the first substrate 159 and the non-display area 153 is disposed at least at a portion of the periphery of the display area 151. In FIG. 1, the first substrate 159 may, for example, include the non-display area 153 disposed at the periphery of the display area 151. The first substrate 159 may include, for example, a pad part 158 connected with a main printed circuit board (PCB). A chip mounting area 154a for supplying data signals to the display area 151 may be disposed in the pad part 158. For example, a data driver may be disposed on the chip mounting area 154a.

At least one or more pixels, a control circuit (e.g., a thin film transistor) to control turn-on or turn-off of the pixels, and signal lines (e.g., a data line and a gate line) for transferring control signals may be disposed at the display area 151. The non-display area 153 may include, for example, a test part 160 to supply a test signal with regard to the detection of a substandard state (or damaged state, pollution state, contamination state, crack state, and so on) of the display area 151 and a first substandard state detection line 157a and a second substandard state detection line 157b disposed in the non-display area 153. At least one of a first test signal line 155a, a second test signal line 158a, and a third test signal line 158b which are used to supply signals to the test part 160 may be disposed at the pad part 158 of the first substrate 159. At least one of the first test signal line 155a, the second test signal line 158a, and the third test signal line 158b may be a line through which a signal for controlling a transistor included in the test part 160 is supplied.

In the case where the display module 100 has a large screen of which the size is greater than or equal to a specific size, a plurality of scan driver parts (or gate drivers) may be disposed. In this example, a plurality of signal lines may be disposed on the first substrate 159. In the example where the display module 100 includes one scan driver part, one of the second test signal line 158a and the third test signal line 158b may be disposed on the first substrate 159, and the display module 100 may, for example, supply a signal from the outside to the test part 160 through one scan driver part.

The sealing substrate 200 may seal at least a portion of the first substrate 159 including the display area 151. Alternatively, the sealing substrate 200 may seal the display area 151 and the non-display area 153 of the first substrate 159. The sealing substrate 200 may not be disposed on the pad part 158 such that one side of the first substrate 159 including the pad part 158 is exposed.

According to various example embodiments, the sealing substrate 200 may be disposed such that one side of the first substrate 159 including the pad part 158 and the chip mounting area 154a is exposed. With regard to the implementation of a flexible display, the sealing substrate 200 may be also formed of a flexible material. With regard to the above description, the sealing substrate 200 which effectively seals the display area 151 and the like may be realized by making a thin film encapsulation (TFE) using a thin film which may be applied to the display module 100. The protection film 300 may be disposed on the sealing substrate 200 to protect a display module (e.g., a liquid crystal display device, an organic light-emitting diode, or the like) from an external stimulation.

The protection film 300 may be disposed such that one side of the first substrate 159 including the pad part 158 and the chip mounting area 154a is exposed. According to various example embodiments, in the case where the display module 100 is implemented with a flexible display, the protection film 300 may be formed of a flexible material. The protection film 300 may have, for example, substantially the same area as the sealing substrate 200 or may, for example, be disposed in a shape to cover the sealing substrate 200.

As described above, the display module 100 may include a first substandard state detection line 157a and a second substandard state detection line 157b disposed on the non-display area 153 and may detect a substandard state occurring in the non-display area 153. For example, the display module 100 may detect a resistance increase of the first substandard state detection line 157a and the second substandard state detection line 157b occurring when stabbing (e.g., cracking) occurs at the non-display area 153 or a dirty substance exists thereon. The resistance increase of the first substandard state detection line 157a and the second substandard state detection line 157b may indicate a condition of the device that may cause a delay of signals supplied to pixels disposed at the display area 151. In the case where a substandard state occurs at the non-display area 153, pixels of the display area 151 may be displayed to be different from surrounding pixels.

Figure 2:
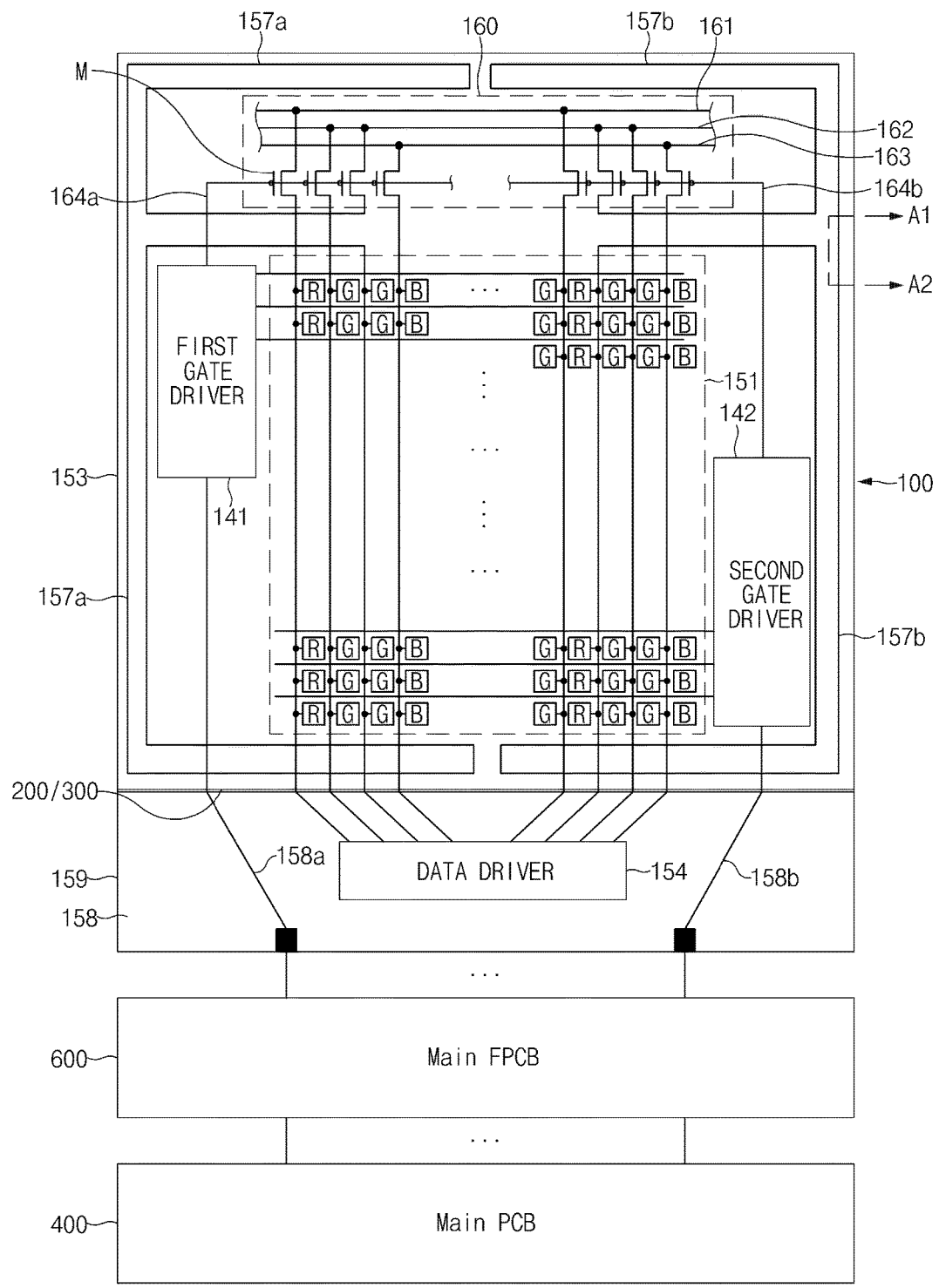
FIG. 2 is a diagram illustrating an example of a display module according to various example embodiments of the present disclosure.

FIG. 2 is a diagram illustrating an example of a display module according to various example embodiments of the present disclosure.

Referring to FIG. 2, the display module 100 may include the display area 151, the non-display area 153, and the pad part 158.

The display area 151 may include a plurality of gate lines (e.g., horizontal lines extending from the first and second gate drivers 141, 142), a plurality of data lines (e.g., vertical lines extending from the data driver 154), and pixels respectively disposed at intersections of the gate lines and the data lines. The display area 151 may include a plurality of unit pixels (e.g., RGB or the like) each including a plurality of sub-pixels (e.g., R, G, and B sub-pixels). When gate signals are respectively supplied to the gate lines, the pixels may operate in response to test signals supplied by, for example, the test part 160 or data signals supplied from the data lines. For example, in the case where the display module 100 is an organic light emitting display device, the pixels may emit light in response to signals supplied thereto, and thus a specific color may be expressed. For example, in the case where the display module 100 is a liquid crystal display device, the pixels may express a specific color based on light transmitted according to an electric field characteristic of liquid crystal which varies in response to signals supplied thereto.

The display area 151 may include at least one gate driver which supplies gate signals to the gate lines. In FIG. 2, an example embodiment of the present disclosure is realized as two gate drivers 141 and 142 are disposed at the display area 151. The gate drivers 141 and 142 may, for example, be able to be disposed at separate areas, for example, the pad part 158 in a chip on glass (COG) type. Alternatively, as illustrated in FIG. 2, the gate drivers 141 and 142 may be disposed at the display area 151 in a COG or chip on film (COF) type. The COF-type arrangement may be applied to the case that the display module 100 is provided in the form of a flexible display. In this example, even though the gate drivers 141 and 142 are disposed at the non-display area 153 as illustrated in FIG. 2, they may be disposed at the display area 151.

The first gate driver 141 may supply gate signals to upper gate lines which are disposed at an upper portion on a drawing basis. In this example, the second gate driver 142 may supply gate signals to lower gate lines. According to various example embodiments, the gate driver 141 may supply specific signals (e.g., a direct current (DC) red signal DC_R, a DC green signal DC_G, a DC blue signal DC_B, and the like) to a test part 160. In addition, the first gate driver 141 may supply a specific gate signal (e.g., a DC gate signal DC_Gate) through a first control signal line 164a connected to a switching circuit M of the test part 160.

The second gate driver 142 may supply specific signals (e.g., the signals DC_R, DC_G, and DC_B) to the test part 160. Operations where the first and second gate drivers 141 and 142 supply the specific signals may be performed at the same time or alternately. In addition, the second gate driver 142 may supply a specific gate signal (e.g., the signal DC_Gate) through a second control signal line 164b connected to the switching circuit M of the test part 160.

An example embodiment of the present disclosure is illustrated as specific gate signals are supplied under the condition that a plurality of gate drivers is disposed. According to various example embodiments, a gate signal from one gate driver may be provided to the test part 160, the first control signal line 164a, the second control signal line 164b, and the like. In the example where only one gate driver is included in the display module 100, the first control signal line 164a and the second control signal line 164b may be integrated into one signal line. In this example, the switching circuit M of the test part 160 may be turned on or off by a signal from the gate driver.

Sub-pixels (e.g., R, G, B, and the like) of the display area 151 may be disposed in a horizontal direction or a vertical direction so as to form various shapes: a matrix, a specific shape, an unspecific shape, and the like. According to an example embodiment, the sub-pixels of the display area 151 may be continuously disposed at data lines which are disposed in the vertical direction. In this example, if a signal is supplied to a specific data line, the signal may be supplied to sub-pixels connected to the corresponding data line. In the example where the test part 160 supplies a specific signal to the data lines at which all sub-pixels of the display area 151 are disposed, each sub-pixel may express a color corresponding to the supplied signal. For example, each sub-pixel may express a white color, a black color, or a specific color. In the example where a substandard state occurs at specific sub-pixels or a unit pixel of the display area 151, a substandard state may be detected with the naked eyes by supplying a signal to the test part 160.

The test part 160 may include a test signal supply part (161, 162, 163) and the switching circuit M. The test signal supply part (161, 162, 163) may include, for example, three signal lines (e.g., DC_R 161, DC_G 162, and DC_B 163) provided to supply specific signals to sub-pixels. The test signal supply part (161, 162, 163) may be connected, for example, with the data lines. According to an example embodiment, the test signal supply part (161, 162, 163) may be supplied with a specific gate signal from at least one of the first gate driver 141 or the second gate driver 142. The signal supplied to the test signal supply part (161, 162, 163) may be supplied to the display area 151 based on a status of the switching circuit M.

The switching circuit M may be disposed between the test signal supply part (161, 162, 163) and the sub-pixels of the display area 151 and may control supplying signals to the display area 151 from the test signal supply part (161, 162, 163). The switching circuit M may be activated by a gate signal supplied from the first gate driver 141 or the second gate driver 142 as a control signal. For example, the switching circuit M may be turned on by a specific gate signal from the gate driver 141 or 142, and thus a signal supplied to the test signal supply part (161, 162, 163) may be supplied to each sub-pixel. The specific gate signal may be supplied, for example, through the first control signal line 164a and the control signal line 164b.

According to various example embodiments, at least a portion of the substandard state detection lines 157a and 157b may be disposed at the non-display area 153. Alternatively, at least a portion of the substandard state detection lines 157a and 157b may be disposed at a boundary area of the display module 100.

According to an example embodiment, the first substandard state detection line 157a may be disposed at a portion of a left area between the display area 151 and the pad part 158, a left area of the non-display area 153, a portion of a left area of an upper area of the non-display area 153, and the like. In addition, for connection with a data line connected to at least one of sub-pixels, the first substandard state detection line 157a may be disposed at a portion of a left area between the test part 160 and the display area 151. The first substandard state detection line 157a may form a closed loop as illustrated. According to an example embodiment, one end of the first substandard state detection line 157a may be connected to a specific switch circuit (e.g., a circuit connected with G sub-pixels of sub-pixels disposed at the left on the basis of the center of a screen) included in the test part 160. The other end of the first substandard state detection line 157a may be connected to a data line which is connected with specific sub-pixels (e.g., G sub-pixels disposed at a specific point of the left) of the sub-pixels. A detection line between the one end and the other end of the first substandard state detection line 157a may be disposed to pass through left boundary areas of the display module 100 or to pass through a partial area (e.g., a left area) of the above-described non-display area 153.

According to an example embodiment, the second substandard state detection line 157b may be disposed at a portion of a right area between the display area 151 and the pad part 158, a right area of the non-display area 153, a portion of a right area of an upper area of the non-display area 153, and the like. In addition, for connection with a data line connected with at least one of sub-pixels, the second substandard state detection line 157b may be disposed at a portion of a right area between the test part 160 and the display area 151.

The second substandard state detection line 157b may form a closed loop as illustrated. For example, one end of the second substandard state detection line 157b may be connected to a specific switch circuit (e.g., a circuitry connected with G sub-pixels of sub-pixels disposed at the right on the basis of the center of a screen) included in the test part 160. The other end of the second substandard state detection line 157b may be connected to a data line which is connected with specific sub-pixels (e.g., G sub-pixels disposed at a specific point of the right) of the sub-pixels. A detection line between the one end and the other end of the second substandard state detection line 157b may be disposed to pass through right boundary areas of the display module 100 or to pass through a partial area (e.g., a right area) of the above-described non-display area 153. According to various example embodiments, the first substandard state detection line 157a and the second substandard state detection line 157b may be disposed to be symmetrical to each other.

An example embodiment of the present disclosure is illustrated as the other ends of the substandard state detection lines 157a and 157b are connected with specific sub-pixels (e.g., G sub-pixels) arranged in the vertical direction. However, the scope and spirit of the present disclosure may not be limited thereto. For example, the other ends of the substandard state detection lines 157a and 157b may be connected to a portion of specific data lines disposed in the vertical direction.

According to an example embodiment, for visibility at a specific area including an area, at which substandard state detection lines are disposed, in expressing a color according to a supplied signal, the other ends of the substandard state detection lines 157a and 157b may be connected with at least one data line disposed at a point (e.g., 1/3, 1/2, 1/5, and the like from the boundary) spaced from the boundary of the display area 151 by a specific distance. Alternatively, the other ends of the substandard state detection lines 157a and 157b may be connected with at least one data line disposed within a range on the basis of the center or the middle of the display area 151.

According to various example embodiments, the substandard state detection lines 157a and 157b may be used for comparison of relative brightness with a surrounding area and may be connected with a portion of all data lines. Alternatively, the substandard state detection lines 157a and 157b may be connected with data lines, which are disposed alternately, from among data lines arranged for improvement of visibility in a substandard state detection procedure. For example, substandard state detection lines may be connected with even-numbered or odd-numbered data lines of continuous data lines or with integer-numbered lines thereof. Alternatively, the other ends of the substandard state detection lines 157a and 157b may be connected with an interval in which the specific number of data lines are arranged regularly or irregularly e.g., when connected to data lines, the other ends of substandard state detection lines are connected with even-numbered data lines, odd-numbered data lines, or N-th data lines and (N−1)-th data lines (M and N being a natural number). In this example, each of the one ends of the substandard state detection lines 157a and 157b may be connected to at least one switching circuit of the switching circuit M connected to a corresponding data line.

The display area 151 where the substandard state detection lines 157a and 157b are disposed may provide a display state when a test signal is supplied through the test part 160 and a display state when a test signal is supplied through a jig or the data driver 154. A user may confirm whether the substandard state detection lines 157a and 157b are abnormal, based on the display state. For example, in the case where a substandard state occurs at the non-display area 153 where the substandard state detection lines 157a and 157b are disposed, a line resistance of a defective line may increase, and thus energy supplied to data lines connected to the substandard state detection lines 157a and 157b may decrease. Consequently, the brightness of a corresponding data line may be brighter than that of a surrounding data line(s) (in the case where a manner to turn on a corresponding pixel is a P-type switching circuit manner) may be darker than that thereof (in the case where a manner to turn on a corresponding pixel is an N-type switching circuit manner).

The pad part 158 may include the data driver 154 and test signal supply lines 158a and 158b. As described above, a data signal may be supplied to the display area 151 with regard to the detection of the substandard state. With regard to the above description, in the case where the data driver 154 is disposed at the chip mounting area 154a of the pad part 158, the data driver 154 may supply a specific signal for test to the display area 151 in response to an external control (e.g., a control of an application processor (AP) on a main PCB 400).

According to various example embodiments, before the data driver 154 is disposed at the chip mounting area 154a of the pad part 158, a specific signal from an external device (e.g., a jig to supply a data signal for test) may be provided to data lines of the display area 151. The test signal supply lines 158a and 158b may be, for example, signal lines for supplying a control signal for test to the first gate driver 141 or the second gate driver 142 (e.g., to one gate driver in the case where the display module 100 is equipped with one gate driver). A gate driver which receives the control signal may supply a specific test signal to the test part 160. In addition, at least one pad and a signal line connected to the data driver 154 may be further disposed at the pad part 158.

According to various example embodiments, additionally, the display module 100 may be directly connected to the main PCB 400 or may be indirectly connected to the main PCB 400 through a flexible printed circuit board 600 (e.g., a main FPCB). An AP and the like may be disposed on the main PCB 400, and the main PCB may supply a specific data signal for test to the data driver 154 of the pad part 158. Furthermore, the flexible printed circuit board 600 (or the main PCB 400) may include an interface connected with an external jig device and may provide a signal supplied from the external jig device to a gate driver.

Figure 3A:
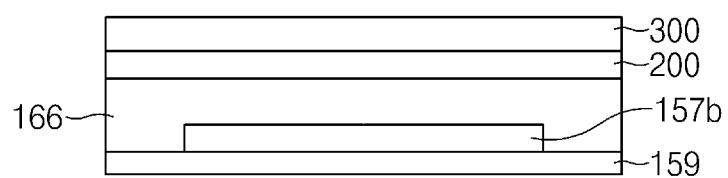
FIGS. 3A and 3B are cross-sectional views of an example display module taken along a line A1-A2 of FIG. 2, according to various example embodiments of the present disclosure.
Figure 3B:
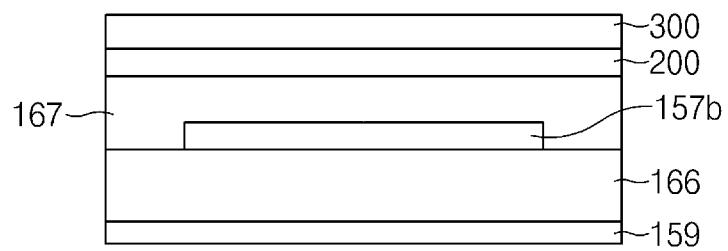

FIGS. 3A and 3B are cross-sectional views of an example display module taken along a line A1-A2 of FIG. 2, according to various example embodiments of the present disclosure.

Referring to FIG. 3A, the display module 100 may include the first substrate 159, the second substandard state detection line 157b, the sealing substrate 200, and the protection film 300. The first substrate 159 may be, for example, a glass substrate or a plastic substrate. Furthermore, the first substrate 159 may a hardened substrate with specific stiffness or a flexible substrate capable of being bent over a specific angle.

According to various example embodiments, data lines may be formed on the first substrate 159 through a deposition process. During the process in which data lines are formed, the second substandard state detection line 157b may be formed on the first substrate 159 through the deposition process. A first insulating layer 166 may be formed on the first substrate 159 to cover the second substandard state detection line 157b. The sealing substrate 200 and the protection film 300 may be sequentially disposed on the first insulating layer 166. Gate lines and thin film transistors may be formed at the display area 151 and between the first insulating layer 166 and the sealing substrate 200.

As described above, according to an example embodiment, the second substandard state detection line 157b may be formed together in the process where data lines are formed. Additionally or alternatively, the first substandard state detection line 157a may be also formed together in the process where the second substandard state detection line 157b is formed. According to an example embodiment, the first substandard state detection line 157a and the second substandard state detection line 157b may be formed of the same material as the data line.

Referring to FIG. 3B, the display module 100 may include the first substrate 159, the first insulating layer 166, the second substandard state detection line 157b, a second insulating layer 167, the sealing substrate 200, and the protection film 300. Data lines may be formed on the first substrate 159 through the deposition process, and the first insulating layer 166 may be formed on the resultant structure. With regard to the above-described process, since lines are not formed at the non-display area 153, the first insulating layer 166 may be formed on the non-display area 153 of the first substrate 159.

The second substandard state detection line 157b may be formed on the first insulating layer 166. Gate lines may be formed on the first insulating layer 166 while the second substandard state detection line 157b is formed thereon. The second insulating layer 167 may be formed on the first insulating layer 166 to cover the second substandard state detection line 157b. The sealing substrate 200 and the protection film 300 may be sequentially disposed on the second insulating layer 167.

As described above, according to various example embodiments, the second substandard state detection line 157b may be formed together in the process where data lines are formed. The first substandard state detection line 157a may be formed together in the process where the second substandard state detection line 157b is formed. The first substandard state detection line 157a and the second substandard state detection line 157b may be formed of the same material as the gate line.

According to various example embodiments, the first substandard state detection line 157a and the second substandard state detection line 157b may be formed on other signal lines (e.g., source and drain lines of thin film transistors, a common electrode for supplying a common voltage, and the like). The first substandard state detection line 157a and the second substandard state detection line 157b may be formed of the same material as corresponding signal lines.

According to various example embodiments, the first substandard state detection line 157a and the second substandard state detection line 157b may be formed at different layers from each other. For example, the first substandard state detection line 157a may be formed at the non-display area of a layer where data lines (or gate lines, sources, drains, and the like) are formed, and the second substandard state detection line 157b may be formed at the non-display area of a layer where gate lines (or data lines, sources, drains, and the like) are formed.

As described above, each of one ends of the first and second substandard state detection lines 157a and 157b may be electrically connected to a test line of the test part 160, and each of the other ends thereof may be electrically connected to at least one of data lines. In the case where a substandard state detection line is formed in forming a different layer, for example, gate lines, a substandard state detection line may be electrically connected to a specific data line through an etching process and the like. According to various example embodiments, the first substandard state detection line 157a and the second substandard state detection line 157b may be formed together during the process where the test part 160 is formed.

As described above, according to various example embodiments, a display module may include a display area which includes a plurality of pixels (e.g., at least ones of pixels or sub-pixels), a plurality of first conductive lines (e.g., data lines), and a plurality of second conductive lines (e.g., gate lines) extending to intersect the first conductive lines, a non-display area surrounding at least a portion of the display area, a circuitry (e.g., a test part) electrically connected with the first conductive lines, and a third conductive line (a substandard state detection line, e.g., a first substandard state detection line) electrically connected between one of the first conductive lines and the circuitry. The third conductive line may include a portion disposed in the non-display area and extending along a periphery of the display area.

According to various example embodiments, the circuitry may include switching elements electrically connected with the first conductive lines respectively, and the third conductive line may electrically connect at least one of the first conductive lines and one of the switching elements.

According to various example embodiments, the display area may include a first periphery extending along a first direction in which the first conductive lines extend, and at least a portion of the third conductive line may further include a portion extending along the first periphery.

According to various example embodiments, the display area may include a second periphery extending along a second direction in which the second conductive lines extend, and at least a portion of the third conductive line may further include a portion extending along the second periphery.

According to various example embodiments, remaining ones of the plurality of first conductive lines other than the first conductive line connected with the third conductive line may extend substantially in parallel and are connected to the circuitry, and the first conductive line connected with the third conductive line may be connected to the circuitry through the third conductive line.

According to various example embodiments, the display area may further include a plurality of pixels, and the plurality of pixels may include a first pixel connected to one of the first conductive lines and a second pixel connected with a first conductive line connected with the third conductive line. When the third conductive line is not damaged, the first pixel and the second pixel may display substantially a same color and/or luminance. When the third conductive line is damaged, the first pixel and the second pixel may display different colors and/or luminance from each other.

According to various example embodiments, the display module may further include a fourth conductive line electrically connected between another of the first conductive lines and the circuitry, and the fourth conductive line may include a portion disposed in the non-display area and extending along a periphery of the display area.

According to various example embodiments, the third conductive line and the fourth conductive line may be respectively formed at different layers from each other.

According to various example embodiments, the display area may include at least one of a data line, a gate line, a thin film transistor source, a thin film transistor drain, and a common electrode.

According to various example embodiments, the third conductive line may be disposed in a layer where at least one of the data line, the gate line, the thin film transistor source, the thin film transistor drain, and the common electrode of a pixel is formed and is electrically connected with at least one first conductive line disposed at a center area of the display area.

As described above, according to various example embodiments, a display module may include a display area where at least one pixel is disposed, a non-display area including a test part supplying a test signal to the display area, and a substandard state detection line disposed in at least a portion of the non-display area and including one end connected to the test part and the other end connected to the at least one pixel.

According to various example embodiments, the display module may further include at least one gate driver supplying a test signal to the third conductive line through the circuitry.

According to various example embodiments, the display module may further include a data driver supplying a data signal to the display area alternately with the test part.

Figure 4:
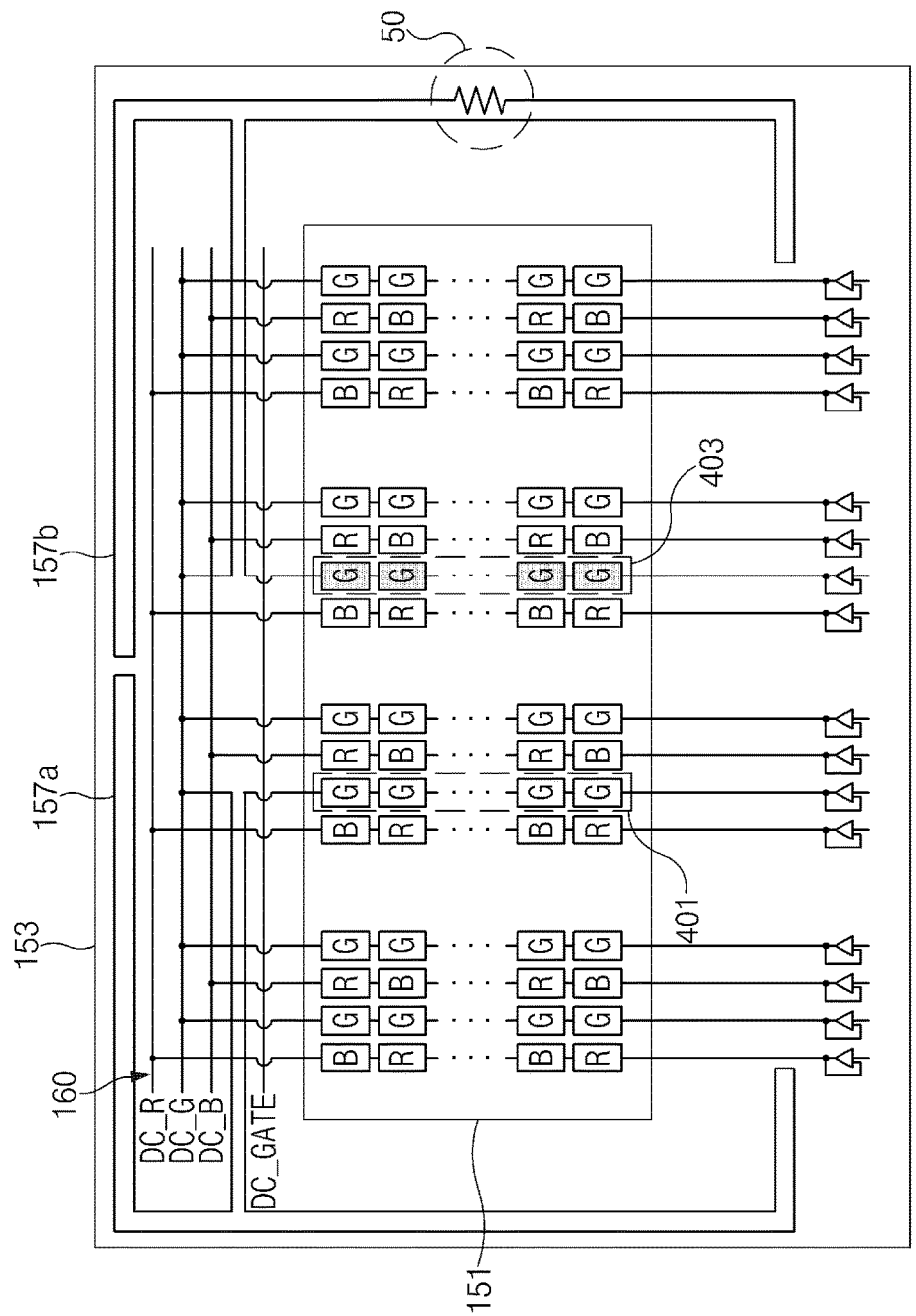
FIG. 4 is a diagram illustrating an example substandard state detection state according to various example embodiments of the present disclosure.

FIG. 4 is a diagram illustrating an example substandard state detection state according to various example embodiments of the present disclosure.

Referring to FIG. 4, the display module 100 may include the display area 151 and the non-display area 153. The test part 160, the first substandard state detection line 157a, and the second substandard state detection line 157b may be disposed at the non-display area 153. Sub-pixels may be arranged at the display area 151 in the form of a matrix, in a specific form, in an unspecific form, and the like. A first data string 401 of the display area 151 may be electrically connected to one end of the first substandard state detection line 157*a*. The other end of the first substandard state detection line 157*a* may be electrically connected to a test signal line (e.g., DC_G) of the test part 160. If a test signal is supplied, it may be transferred to the first substandard state detection line 157*a* through the test signal line and the switching circuit M and may be also supplied to the first data string 401.

A second data string 403 of the display area 151 may be electrically connected to one end of the second substandard state detection line 157*b*. The other end of the second substandard state detection line 157*b* may be electrically connected to a specific test line (e.g., DC_G: a test signal line the same as a line to which one end of the first substandard state detection line 157*a* is connected) of the test part 160. If a test signal is supplied, it may be transferred to the second substandard state detection line 157*b* through the test signal line and the switching circuit M and may be also supplied to the second data string 403.

According to various example embodiments, the first data string 401 or the second data string 403 may include data lines connected to a unit pixel as well as sub-pixels connected to one data line. For example, the first data string 401 may include data lines which are connected to a unit pixel including sub-pixels RGGB. A unit pixel for detecting a substandard state may be disposed at a specific position (e.g., a position spaced from the center or the periphery by a specific distance) of the display area 151 in consideration of visibility as described above.

As described above, as the first substandard state detection line 157*a* and the second substandard state detection line 157*b* are disposed to surround at least a part of the non-display area 153 (or an edge area of the display module 100), a resistance value of a data line may change in the case where a damage occurs at the non-display area 153. In this example, a voltage charged in a storage capacitor of a thin film transistor connected to the data line may be different from that charged in a storage capacitor of a thin film transistor connected to a different data line. Consequently, the brightness of the data line to which a substandard state detection line is connected may be different from that of a surrounding data line at the display area 151.

An example embodiment of the present disclosure is illustrated in FIG. 4 as an example damage 50 occurs at the second substandard state detection line 157*b*. As the damage 50 occurs at the second substandard state detection line 157*b*, a line resistance of the second substandard state detection line 157*b* may increase. In this example, the second data string 403 connected to the second substandard state detection line 157*b* may display a different color (e.g., a black color, a white color, or a color corresponding to the magnitude of a supplied DC gate line or data signal) or a different brightness from a surrounding portion. Since no damage occurs at the first substandard state detection line 157*a*, no line resistance may increase. A color expressed by the first data string 401 connected to the first substandard state detection line 157*a* may be the same as that expressed by data strings adjacent thereto.

The display area 151 of the display module 100 may be supplied with data through a data driver at a normal environment or in driving a screen. According to an example embodiment, at a substandard state detection environment, the display area 151 may be alternately supplied with a data signal from the data driver 154 and a DC gate signal from a gate line for the detection of a substandard state. For example, a DC gate signal for displaying a black color on the display area 151 may be supplied to the display area 151, and a data signal for displaying a white color on the display area 151 may be alternately supplied to the display area 151.

In the example where a stabbing or a crack occurs on at least a portion of substandard state detection lines or a conductive foreign substance is put thereon, a line resistance of the substandard state detection lines may increase. In this example, since the amount of charges charged on a vertical line (e.g., a data line) to which the substandard state detection lines are connected is different from that charged on a different data line (or a charging speed about the vertical line is different from that of the different data line), a horizontal line according to occurrence of a substandard state may be seen from the display area 151. According to an example embodiment, a data voltage value and a charged amount of a storage capacitor may change periodically while DC gate and data signals which have values for displaying different colors or brightness from each other are alternately supplied.

According to various example embodiments, a frame frequency of a signal for detecting a substandard state may change while a substandard state of the display module 100 is detected. An external jig device or a processor of an electronic device which supplies a signal for detecting a substandard state may decrease a frame frequency to be lower than a frame frequency at a normal driving operation. In this example, background luminance of a substandard state detection line (or the vertical line) may decrease, thereby making it possible for the substandard state detection line to be seen more clearly.

Figure 5:
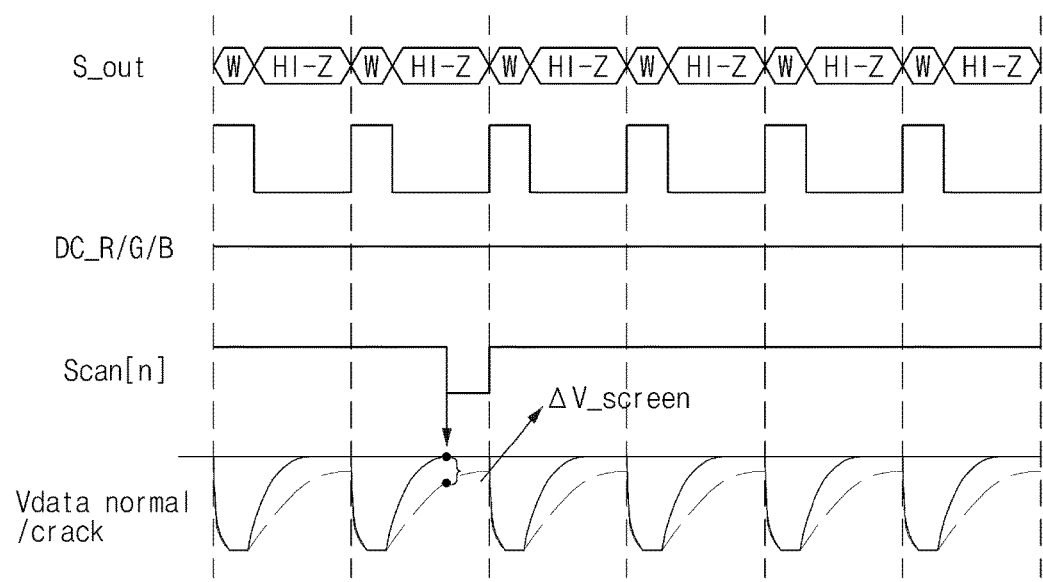
FIG. 5 is a diagram illustrating example data waveforms corresponding to a substandard state detection state, according to various example embodiments of the present disclosure.

FIG. 5 is a diagram illustrating an example data waveform corresponding to an example substandard state detection state, according to various example embodiments of the present disclosure.

Referring to FIG. 5, an illustrated data waveform may refer, for example, to sub-pixels of the second data string 403 connected with the second substandard state detection line 157*b* at which the damage 50 occurs as illustrated in FIG. 4. For example, with regard to a time (hereinafter referred to as "change time") when a color is changed from a while color W to a non-white color HI-Z (e.g., a black color), a change time of sub-pixels (or unit pixels) disposed at the second data string 403 may be different from a change time of surrounding pixels. In this example, a color displayed by the sub-pixels of the second data string 403 at which the damage 50 occurs may be different from that displayed by surrounding sub-pixels. A white color is exemplified, but various colors may be displayed based on a characteristic of a line, which is connected with the substandard state detection line 157*b* at which the damage 50 occurs, so as to be different from a surrounding portion. As in the above description, in the case where an area of the non-display area 153 where the second substandard state detection line 157*b* is disposed is damaged, a color of the second data string 403 may be seen to be different from that of a surrounding portion. Due to a line resistance of the second substandard state detection line 157*b*, the supply of a DC_GATE signal may be partially performed, or a charged amount or a charging time of a storage capacitor of a corresponding data string may be different from that of a surrounding data string. A Vdata characteristic of pixels disposed at the second data string 403 may curve to be different from a normal situation.

Figure 6:
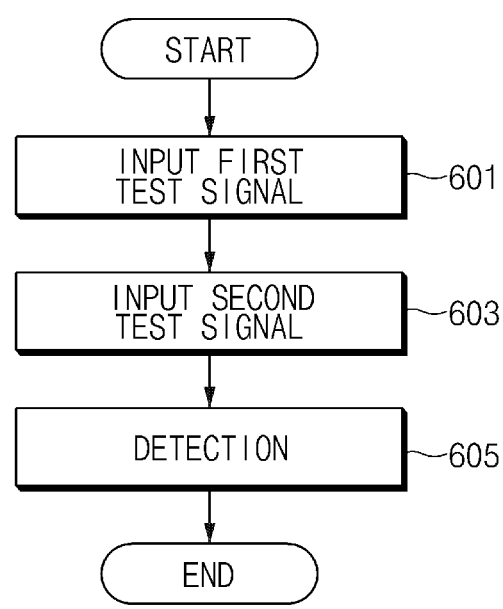
FIG. 6 is a flowchart illustrating an example substandard state detection method according to various example embodiments of the present disclosure.

FIG. 6 is a flowchart illustrating an example substandard state detection method according to various example embodiments of the present disclosure.

Referring to FIG. 6, in operation 601, at least one of an external jig device or a processor of an electronic device may input a first test signal to the display module 100. The first test signal may be a DC gate signal which is set to allow the display area 151 to display a black color (or a first color or brightness).

In operation 603, at least one of the external jig device or the processor of the electronic device may input a second test signal to the display module 100. The second test signal may be a data signal which is set to allow the display area 151 to display a while color (or a second color or brightness different from the first color or brightness). The second test signal may be supplied with a specific time interval (e.g., a supply period) after the first test signal is supplied. For example, the first test signal and the second test signal may be alternately supplied with a specific time interval. A supply period of the first and second test signals may be adjusted according to an external input.

In operation 605, the external jig device or the processor of the electronic devices may detect whether or not of a change of the display area 151. At least one of the external jig device or the processor of the electronic device may obtain information about a change state of a specific data string; if the obtained information indicates that the change state of the specific data string is different from that of a surrounding portion, the at least one of the external jig device or the processor of the electronic device may output specific notification. Operation 605 may, for example, be replaced with examination with the naked eye. For the examination with the naked eye, operation 601 and operation 602 may be repeated during a specific time.

Figure 7:
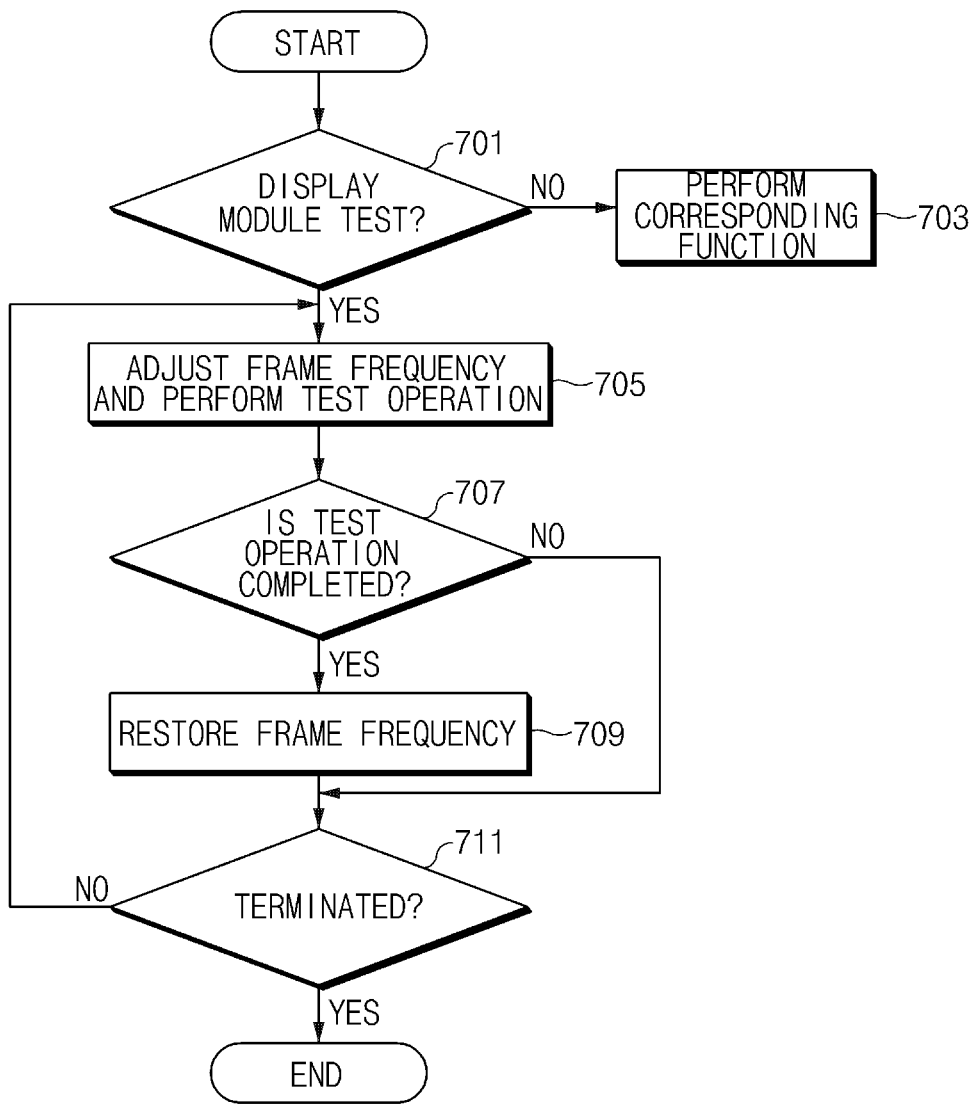
FIG. 7 is a flowchart illustrating an example substandard state detection method according to another example embodiment of the present disclosure.

FIG. 7 is a flowchart illustrating an example substandard state detection method according to another example embodiment of the present disclosure.

Referring to FIG. 7, in operation 701, at least one of an external jig device or a processor of an electronic device may determine whether to test the display module 100. If an event (e.g., execution of a function for testing the display module 100 or a connection with an external jig device) associated with a display module test does not occur, in operation 703, the electronic device may perform a specific function. For example, the electronic device may output a screen corresponding to the occurring event.

If an event associated with the display module test occurs, in operation 705, at least one of the external jig device or the processor of the electronic device may adjust a frame frequency and may perform a test operation based on the adjusted frame frequency. For example, the processor may adjust at least one of an output signal of a data driver or an output signal of a gate driver. According to various example embodiments, the processor may adjust a frequency of the display module 100 or a supplied signal (e.g., a power signal). According to an example embodiment, the processor may adjust the magnitude of the DC gate signal or a level of the common voltage such that background luminance decreases. In operation 707, the external jig device or the processor of the electronic device may determine whether a test is completed (e.g., whether a connection with the external jig device is released or whether there occurs an event for an end of a display module test). When a test is not completed, the substandard state detection method may skip operation 709.

When an event indicating that the test is completed occurs, in operation 709, the external jig device or the processor of the electronic device may restore a frame frequency of the electronic device. Alternatively, the processor may restore the level of the common voltage to an original level.

In operation 711, the external jig device or the processor of the electronic device may determine whether an event associated with a function end (or turn-off) of the electronic device occurs. In the case where no function end event occurs, the procedure may proceed to operation 705 to repeat the above-described operation.

As described above, the substandard state detection method according to an example embodiment may change a frame frequency of a signal (e.g., a data signal or a gate signal) supplied to the display module 100 to detect a substandard state. For example, with regard to the substandard state detection method, the processor may decrease a frame frequency. The frame frequency may be changed based on a physical characteristic of the display module 100, to decrease background luminance. With regard to the detection of a substandard state, in the case of increasing or decreasing a frame frequency to decrease the background luminance, the processor may temporarily increase or decrease the frame frequency during the substandard state detection procedure. If the detection of a substandard state is completed, the processor may restore the changed frame frequency to an original frequency.

As described above, according to various example embodiments, a substandard state detecting method may include alternately performing an operation to supply a first signal through a third conductive line, which is connected with at least one of first conductive lines and of which the at least a portion is disposed at a non-display area surrounding at least a portion of a display area including the first conductive lines and a plurality of second conductive lines intersected with each other, and an operation to supply a second signal through the first conductive line, and determining whether a display state expressed by a first conductive line to which the third conductive line is connected is different from a display state expressed by surrounding data lines.

According to various example embodiments, the alternately performing may include supplying a specific direct current gate signal as the first signal to the first conductive line and supplying a specific data signal as the second signal.

According to various example embodiments, the alternately performing may include adjusting at least one of a magnitude or a period of at least one of the direct current gate signal or a specific data signal, to allow background luminance of the display area to have a specific value.

As described above, according to various example embodiments, a substandard state detecting method may include alternately performing an operation to supply a test signal to a display area, at which at least one pixel is disposed, through a test part disposed on a non-display area and a specific data signal to a data line of the display area and determining whether a display state expressed by a data line to which a substandard state detection line formed through the non-display area is connected is different from a display state expressed by surrounding data lines.

According to various example embodiments, the method may further include adjusting at least one of a magnitude or a supply period of the test signal or the data signal.

According to various example embodiments, the method may further include adjusting at least one of a magnitude or a supply period of the test signal or the data signal, to allow background luminance of the display area to be reduced to a specific value.

According to various example embodiments, the method may further include restoring at least one of the adjusted magnitude or the adjusted supply period in completing a detection of a substandard state.

According to various example embodiments, the method may further include receiving at least one of the test signal or the data signal from an external device.

Figure 8:
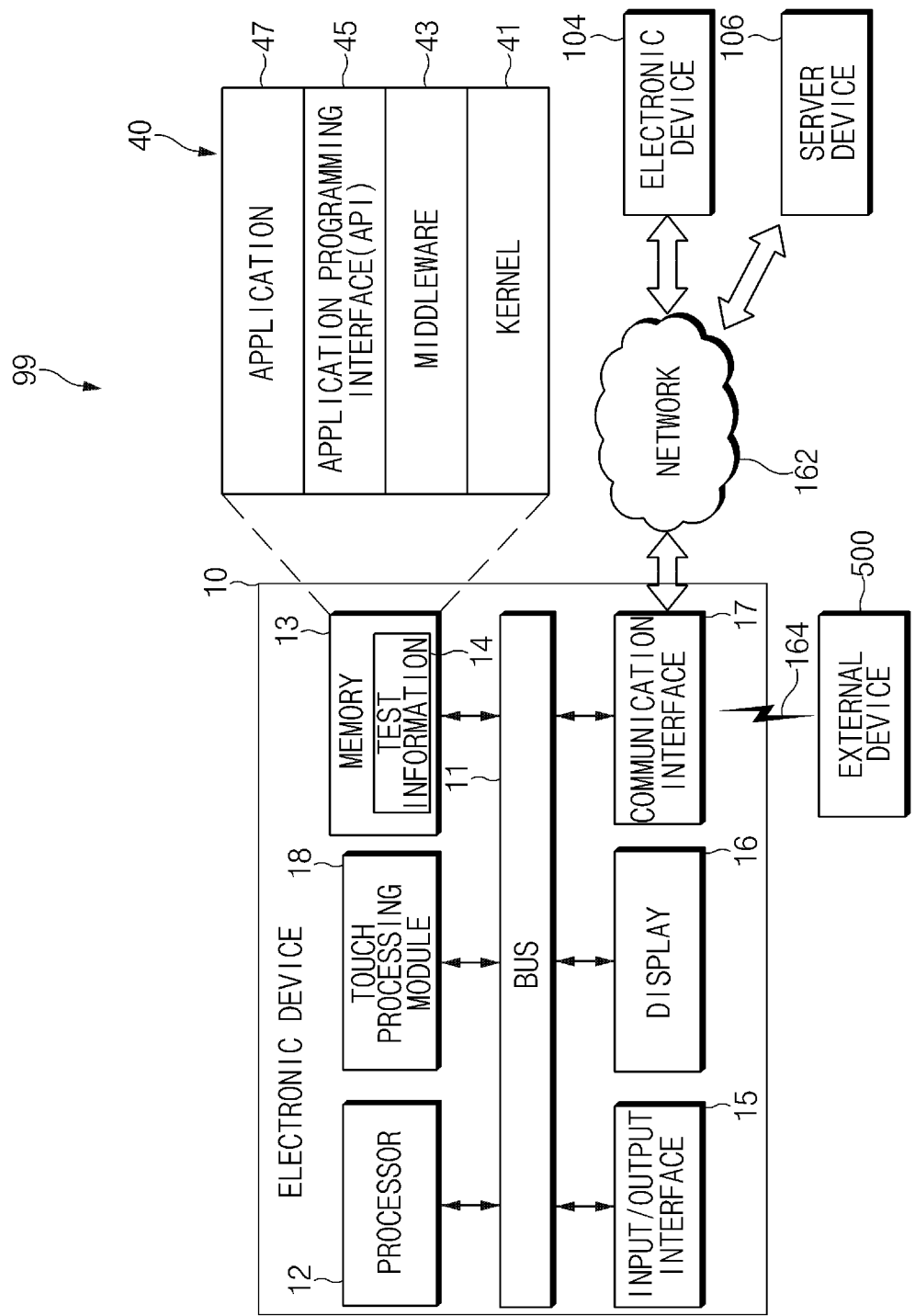
FIG. 8 is a block diagram illustrating an example application environment of an example electronic device according to various example embodiments of the present disclosure.

FIG. 8 is a block diagram illustrating an example application environment of an electronic device according to various example embodiments of the present disclosure.

Referring to FIG. 8, an electronic device application environment 99 according to various example embodiments may include an electronic device 10 and an external device 500. The electronic device application environment 99 may further comprise an external electronic device 104, a server device 106, and a network 162.

The electronic device 10 may include a bus 11, a processor 12, a memory 13, an input/output interface 15, a display module 16 (e.g., the display module 100), a communication module 17, and a touch processing module 18. According to an example embodiment, the electronic device 10 may not include at least one of the above-described components or may further include other component(s).

The electronic device 10 may, for example, be a device which supports the display module 16 tested according to a substandard state detection method described with reference to various example embodiments or the electronic device 10 may perform the test the display module 16 according to a substandard state detection method described with reference to various example embodiments. For example, as described above, the display module 16 may be tested according to a first test signal (e.g., a DC gate signal) and a second test signal (e.g., a data signal) supplied from the external device 500 (e.g., a jig device). To this end, the display module 16 may include a substandard state detection line which is disposed at the non-display area 153 and has one end connected with a data line of the display area 151 and the other end connected with the test part 160 supplying a test signal to the display area 151. The number of substandard state detection lines may be determined based on a number of detection areas of the non-display area 153. For example, the substandard state detection line may be disposed to detect a damage of at least a portion of a left area, a right area, or the whole area of the non-display area 153. In the case where a plurality of substandard state detection lines is provided, one end of each substandard state detection line may be connected with at least one pixel of the display area 151. Furthermore, to improve visibility, a substandard state detection line may be connected to a plurality of pixels or sub-pixels. According to various example embodiments, assuming that the display module 16 at which a substandard state is detected is discarded, substandard state detection lines may be connected to one pixel (or one sub-pixel) even though a plurality of substandard state detection lines is provided.

The bus 11 may support a signal flow among components of the electronic device 10. For example, the bus 11 may transfer a test signal, which the external device 500 provides, to the display module 16 through the communication interface 17.

The processor 12 may include one or more of a central processing unit (CPU), an application processor (AP), or a communication processor (CP). The processor 12 may perform, for example, data processing or an operation associated with control and/or communication of at least one other component(s) of the electronic device 10. The processor 12 may support the test of the display module 16 of the electronic device 10. For example, when the electronic device 10 is connected with the external device 500, the bus 12 may transfer a test signal, which the external device 500 provides, to the display module 16. Alternatively, in the case where the electronic device 10 is not connected with the external device 500, under control of the processor 12, specific test signals (e.g., a DC gate signal or a data signal for test) corresponding to an external input may be transferred to the display module 16. As regards this test operation, the processor 12 may control the entering to a test environment of the display module 16 and the end of the test environment.

The memory 13 may include a volatile and/or nonvolatile memory. The memory 13 may store instructions or data associated with at least one other component(s) of the electronic device 10. According to an example embodiment, the memory 13 may store software and/or a program 40. The program 40 may include, for example, a kernel 41, a middleware 43, an application programming interface (API) 45, and/or an application program (or an application) 47. At least a portion of the kernel 41, the middleware 43, or the API 45 may be called an "operating system (OS)". According to an example embodiment, the memory 13 may store test information 14. The test information 14 may include information associated with a DC gate signal for test or a data signal for test. Furthermore, the test information 14 may include test status information of the display module 16. The test status information may include a test progress time, a test result, and the like associated with the display module 16.

The kernel 41 may control or manage system resources (e.g., the bus 11, the processor 12, the memory 13, and the like) that are used to execute operations or functions of other programs (e.g., the middleware 43, the API 45, and the application program 47). Furthermore, the kernel 41 may provide an interface that allows the middleware 43, the API 45, or the application program 47 to access discrete components of the electronic device 10 so as to control or manage system resources.

The middleware 43 may perform a mediation role such that the API 45 or the application program 47 communicates with the kernel 41 to exchange data.

Furthermore, the middleware 43 may process task requests received from the application program 47 according to a priority. For example, the middleware 43 may assign the priority, which makes it possible to use a system resource (e.g., the bus 11, the processor 12, the memory 13, or the like) of the electronic device 10, to at least one of the application program 47. For example, the middleware 43 may process the one or more task requests according to the priority assigned to the at least one, which makes it possible to perform scheduling or load balancing on the one or more task requests.

The API 45 may be an interface through which the application program 47 controls a function provided by the kernel 41 or the middleware 43, and may include, for example, at least one interface or function (e.g., an instruction) for a file control, a window control, image processing, a character control, or the like.

The I/O interface 15 may transmit an instruction or data, input from a user or another external device, to other component(s) of the electronic device 10. Furthermore, the I/O interface 15 may output an instruction or data, received from other component(s) of the electronic device 10, to a user or another external device. For example, the input/output interface 15 may process at least one of an input function for processing a user input of the electronic device

10 or an output function for outputting audio information, lamp, or vibration according to an operation of the function. According to an example embodiment, the input/output interface 15 may include various input means such as physical buttons, a keypad, a touch pad, and the like and may generate an input signal according to a user input. For example, the input/output interface 15 may generate an input signal for changing a test environment of the display module 16, an input signal for ending the test environment, and the like.

The display module 16 may include, for example, a liquid crystal display (LCD), a light-emitting diode (LED) display, an organic LED (OLED) display, or a microelectromechanical systems (MEMS) display, or an electronic paper display, or the like. The display module 16 may display, for example, various contents (e.g., a text, an image, a video, an icon, a symbol, and the like) to a user. The display module 16 may include a touch screen and may receive, for example, a touch, gesture, proximity, or hovering input using an electronic pen or a portion of a user's body.

According to an example embodiment, the display module 16 may output at least one user interface according to an operation of a function of the electronic device 10. For example, the display module 16 may output at least one of an idle screen, a home screen, a menu screen, or an icon arrangement screen. The display module 16 may output, for example, a screen associated with a test environment or a screen associated with a non-test environment (e.g., a function execution state). Under the test environment, the display module 16 may output a white screen or a black screen corresponding to a supplied signal. In the case where a damage occurs at a portion of the non-display area 153, the display module 16 may output vertical lines of which the color or luminance is different from that of at least one surrounding portion. In the case where no damage occurs, the display area 151 may output a screen of the same luminance or color. If the test environment ends, the display module 16 may output a specific screen in response to a control of the processor 12.

The communication interface 17 may establish communication between the electronic device 10 and an external device (e.g., the external device 500, the external electronic device 104, or a server device 106). For example, the communication interface 17 may be connected to the network 162 through wireless communication or wire communication and may communicate with an external device (e.g., the external electronic device 104 or the server device 106). The communication interface 17 may establish a communication channel of the electronic device 10. According to an example embodiment, the communication interface 17 may include a wire-wireless communication module. The communication interface 17 may perform interfacing with the external device 500. The communication interface 17 may receive a test signal (e.g., a DC gate signal and the like) from the external device 500.

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 164. The local area network 164 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou") or Galileo, the European global satellite-based navigation system, or the like. In this specification, "GPS" and "GNSS" may be interchangeably used. The wired communication may include at least one of, for example, a universal serial bus (USB), a high definition multimedia interface (HDMI), a recommended standard-132 (RS-132), or a plain old telephone service (POTS), or the like. The network 162 may include at least one of telecommunications networks, for example, a computer network (e.g., LAN or WAN), an Internet, or a telephone network.

The touch processing module 18 may detect a damage state of a touch panel; when a damage occurs, the touch processing module 18 may output notification indicating that a damage occurs. For example, under control of the data processing module 18, a specific signal (e.g., a DC gate signal, a data signal for test, or the like) may be alternately supplied to substandard state detection lines (e.g., third conductive lines and fourth conductive lines) based on an external input or specific scheduling information. The touch processing module 18 may detect whether a color or luminance of a specific substandard state detection line (e.g., a data line to which a substandard state detection line is connected) is different from that of a surrounding portion. Under control of the touch processing module 18, the detection result may be outputted through the display module 16 with a specific text or image.

Each of the external device 500 and the external electronic device 104 may be a device of which the type is different from or the same as that of the electronic device 10. According to an example embodiment, the server device 106 may include a group of one or more servers. According to various example embodiments, all or a part of operations that the electronic device 10 will perform may be executed by another or a plurality of electronic devices (e.g., the external device 500, the external electronic device 104, or the server device 106). According to an example embodiment, in the case where the electronic device 10 executes any function or service automatically or in response to a request, the electronic device 10 may not perform the function or the service internally, but, alternatively additionally, it may request at least a portion of a function associated with the electronic device 101 at other device (e.g., the external device 500, the external electronic device 104 or the server device 106). The other electronic device (e.g., the external device 500, the external electronic device 104 or the server device 106) may execute the requested function or additional function and may transmit the execution result to the electronic device 10. The electronic device 10 may provide the requested function or service using the received result or may additionally process the received result to provide the requested function or service. To this end, for example, cloud computing, distributed computing, or client-server computing may be used.

Each of the external device 500 and the external electronic device 104 may be a device which supplies a test signal to the electronic device 10. For example, the external device 500 may be a jig device for testing a substandard state of the display module 16. As described above, the external device 500 may provide at least a portion of test signals for testing a substandard state of the display module 16. Alternatively, in the case where the electronic device 10 is configured to generate and supply all test signals for testing a substandard state, the external device 500 may be excluded from components for testing the display module 16.

In accordance with another aspect of the present disclosure, an electronic device may include an electronic device housing, a display module exposed through at least one side of the electronic device housing, and a processor disposed in the housing and electrically connected to the display module. The display module may include a display area which includes a plurality of pixels, a plurality of first conductive lines (e.g., data lines), a plurality of second conductive lines (e.g., gate lines) intersecting the first conductive lines, a non-display area surrounding at least a portion of the display area, circuitry electrically connected with the first conductive lines, and a third conductive line (e.g., a substandard state detection line) electrically connected between one of the first conductive lines and the circuitry. The third conductive line may include a portion disposed in the non-display area and extending along a periphery of the display area.

According to various example embodiments, the circuitry may include switching elements electrically connected with the first conductive lines respectively, and the third conductive line may electrically connect at least one of the first conductive lines and one of the switching elements.

According to various example embodiments, the display area may include a first periphery extending along a first direction in which the first conductive lines extend, and at least a portion of the third conductive line may include a portion extending along the first periphery.

According to various example embodiments, the display area may include a second periphery extending along a second direction in which the second conductive lines extend, and at least a portion of the third conductive line may include a portion extending along the second periphery.

According to various example embodiments, remaining ones of the plurality of first conductive lines other than the first conductive line connected with the third conductive line may extend substantially in parallel and may be connected to the circuitry, and the first conductive line connected with the third conductive line may be connected to the circuitry through the third conductive line.

According to various example embodiments, the display area may further include a plurality of pixels, and the plurality of pixels may include a first pixel connected to one of the first conductive lines and a second pixel connected with a first conductive line connected with the third conductive line. When the third conductive line is not damaged, the first pixel and the second pixel may display substantially a same color and/or luminance. When the third conductive line is damaged, the first pixel and the second pixel may display different colors and/or luminance from each other.

According to various example embodiments, the display module may further include a fourth conductive line electrically connected between another of the first conductive lines and the circuitry, and the fourth conductive line may include a portion disposed in the non-display area and extending along a periphery of the display area.

According to various example embodiments, the third conductive line and the fourth conductive line may be respectively formed at different layers from each other.

According to various example embodiments, the display area may include at least one of a data line, a gate line, a thin film transistor source, a thin film transistor drain, and a common electrode.

According to various example embodiments, the third conductive line may be disposed in a layer where at least one of the data line, the gate line, the thin film transistor source, the thin film transistor drain, and the common electrode of a pixel is formed and is electrically connected with at least one first conductive line disposed at a center area of the display area.

The electronic device may further include at least one of a data driver to which the first conductive lines are electrically connected or at least one gate driver supplying a test signal to the third conductive line through the circuitry.

According to various example embodiments, the processor may be configured to alternately output a data signal of the data driver and the test signal to the display area.

According to various example embodiments, the processor is configured to supply a specific direct current gate signal and a specific data signal alternately to the third conductive line.

According to various example embodiments, the processor may be configured to adjust at least one of a magnitude or a period of at least one of the direct current gate signal or a data signal for test, to allow background luminance of the display area to have a specific value.

As described above, according to various example embodiments, an electronic device may include a display module and a processor. The display module may include a display area where at least one pixel is disposed, a non-display area including a test part supplying a test signal to the display area, and a substandard state detection line disposed in at least a portion of the non-display area and including one end connected to the test part and the other end connected to the at least one pixel. Under control of the processor, a data signal for test may be supplied to the test part.

Figure 9:
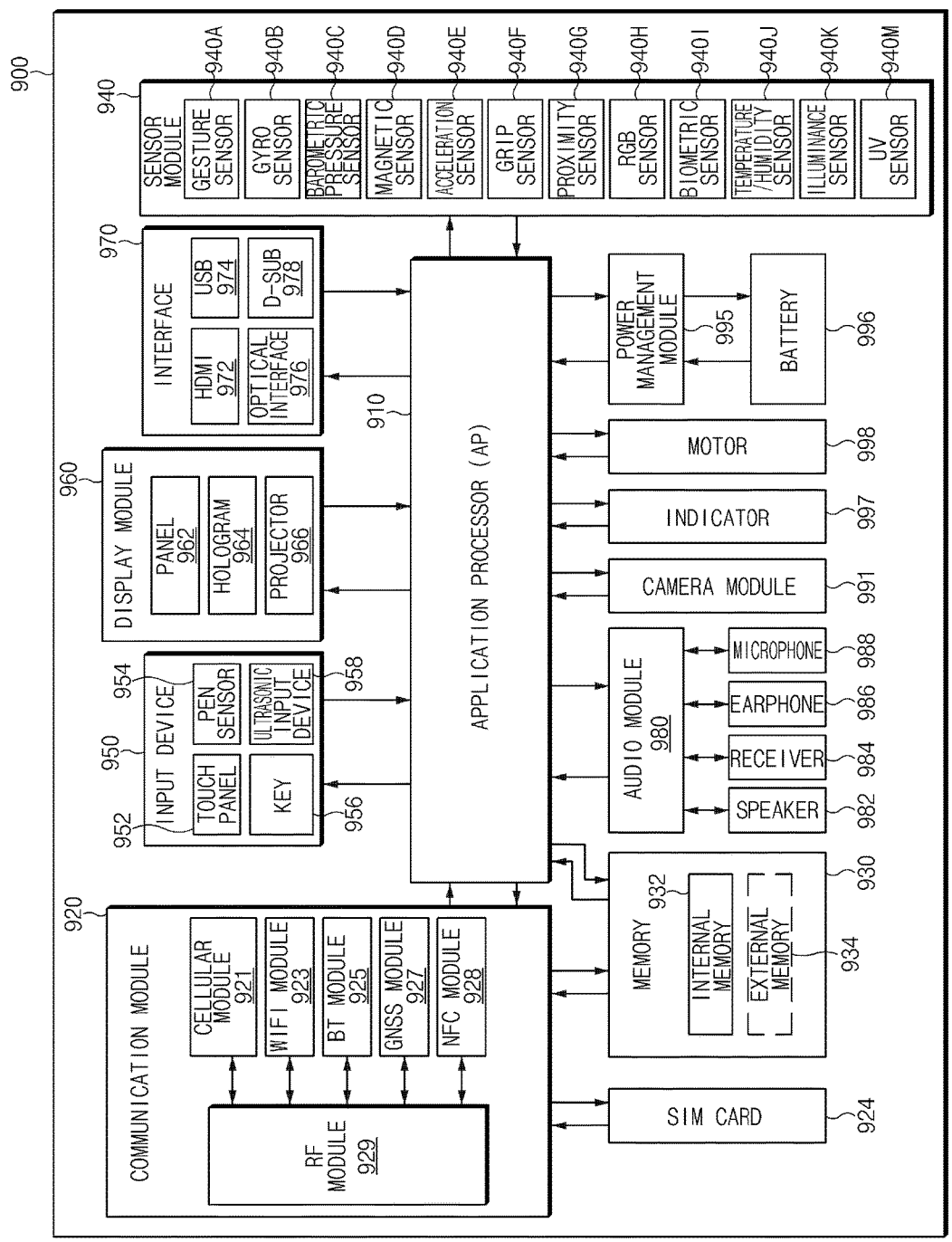
FIG. 9 is a block diagram illustrating an example electronic device according to various example embodiments of the present disclosure.

FIG. 9 is a block diagram illustrating an example electronic device 900 according to various example embodiments of the present disclosure.

Referring to FIG. 9, an electronic device 900 may include, for example, all or a part of an electronic device 10 illustrated in FIG. 8. The electronic device 900 may include one or more processors (e.g., an application processor) 910, a communication module 920, a subscriber identification module 924, a memory 930, a sensor module 940, an input device 950, a display module 960, an interface 970, an audio module 980, a camera module 991, a power management module 995, a battery 996, an indicator 997, and a motor 998.

The processor 910 may drive an operating system (OS) or an application to control a plurality of hardware or software components connected to the processor 910 and may process and compute a variety of data. The processor 910 may be implemented with a System on Chip (SoC), for example. According to an example embodiment, the processor 910 may further include a graphic processing unit (GPU) and/or an image signal processor. The processor 910 may include at least a part (e.g., a cellular module 921) of components illustrated in FIG. 9. The processor 910 may load and process an instruction or data, which is received from at least one of other components (e.g., a nonvolatile memory), and may store a variety of data at a nonvolatile memory.

The communication module 920 may be configured the same as or similar to a communication interface 17 of FIG. 8. The communication module 920 may include a cellular module 921, a Wi-Fi module 923, a Bluetooth (BT) module 925, a GNSS module 927, a near field communication (NFC) module 928, and a radio frequency (RF) module 929.

The cellular module 921 may provide voice communication, video communication, a character service, an Internet service or the like through a communication network. According to an example embodiment, the cellular module 921 may perform discrimination and authentication of the electronic device 900 within a communication network using the subscriber identification module 924 (e.g., a SIM card), for example. According to an example embodiment, the cellular module 921 may perform at least a portion of functions that the processor 910 provides. According to an example embodiment, the cellular module 921 may include a communication processor (CP).

Each of the Wi-Fi module 923, the BT module 925, the GNSS module 927, and the NFC module 928 may include a processor for processing data exchanged through a corresponding module, for example. According to an example embodiment, at least a portion (e.g., two or more components) of the cellular module 921, the Wi-Fi module 923, the BT module 925, the GNSS module 927, and the NFC module 928 may be included within one Integrated Circuit (IC) or an IC package.

The RF module 929 may transmit and receive a communication signal (e.g., an RF signal). The RF module 929 may include a transceiver, a power amplifier module (PAM), a frequency filter, a low noise amplifier (LNA), an antenna, or the like. According to various example embodiments, at least one of the cellular module 921, the Wi-Fi module 923, the BT module 925, the GNSS module 927, or the NFC module 928 may transmit and receive an RF signal through a separate RF module.

The subscriber identification module 924 may include, for example, a subscriber identification module and may include unique identify information (e.g., integrated circuit card identifier (ICCID)) or subscriber information (e.g., integrated mobile subscriber identity (IMSI)).

The memory 930 (e.g., the memory 13) may include an internal memory 932 or an external memory 934. For example, the internal memory 932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 934 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 934 may be functionally and/or physically connected to the electronic device 900 through various interfaces.

The sensor module 940 may measure, for example, a physical quantity or may detect an operation state of the electronic device 900. The sensor module 940 may convert the measured or detected information to an electrical signal. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., red, green, blue (RGB) sensor), a biometric sensor 940I, a temperature/humidity sensor 940J, an illuminance sensor 940K, or an UV sensor 940M. Even though not illustrated, additionally or alternatively, the sensor module 940 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 940 may further include a control circuit for controlling at least one or more sensors included therein. According to an example embodiment, the electronic device 900 may further include a processor which is a part of the processor 910 or independent of the processor 910 and is configured to control the sensor module 940. The processor may control the sensor module 940 while the processor 910 remains at a sleep state.

The input device 950 may include, for example, a touch panel 952, a (digital) pen sensor 954, a key 956, or an ultrasonic input unit 958. The touch panel 952 may use at least one of capacitive, resistive, infrared and ultrasonic detecting methods. Also, the touch panel 952 may further include a control circuit. The touch panel 952 may further include a tactile layer to provide a tactile reaction to a user.

The (digital) pen sensor 954 may be, for example, a part of a touch panel or may include an additional sheet for recognition. The key 956 may include, for example, a physical button, an optical key, a keypad, and the like. The ultrasonic input device 958 may detect (or sense) an ultrasonic signal, which is generated from an input device, through a microphone (e.g., a microphone 988) and may check data corresponding to the detected ultrasonic signal.

The display module 960 (e.g., the display module 16) may include a panel 962, a hologram device 964, or a projector 966. The panel 962 may be configured the same as or similar to the display module 16 of FIG. 8. The panel 962 may be implemented to be flexible, transparent or wearable, for example. The panel 962 and the touch panel 952 may be integrated into a single module. The hologram device 964 may display a stereoscopic image in a space using a light interference phenomenon. The projector 966 may project light onto a screen so as to display an image. The screen may be arranged in the inside or the outside of the electronic device 900. According to an example embodiment, the display module 960 may further include a control circuit for controlling the panel 962, the hologram device 964, or the projector 966.

The interface 970 may include, for example, an HDMI (high-definition multimedia interface) 972, a USB (universal serial bus) 974, an optical interface 976, or a D-sub (D-subminiature) 978. The interface 970 may be included, for example, in the communication interface 17 illustrated in FIG. 8. Additionally or alternatively, the interface 970 may include, for example, a mobile high definition link (MHL) interface, a SD card/multi-media card (MMC) interface, or an infrared data association (IrDA) standard interface.

The audio module 980 may convert a sound and an electrical signal in dual directions. At least a portion of the audio module 980 may be included, for example, in the input/output interface 15 illustrated in FIG. 8. The audio module 980 may process, for example, sound information that is input or output through a speaker 982, a receiver 984, an earphone 986, or a microphone 988.

The camera module 991 for shooting a still image or a video may include, for example, at least one image sensor (e.g., a front sensor or a rear sensor), a lens, an image signal processor (ISP), or a flash (e.g., an LED or a xenon lamp)

The power management module 995 may manage, for example, power of the electronic device 900. According to an example embodiment of the present disclosure, a power management integrated circuit (PMIC) a charger IC, or a battery or fuel gauge may be included in the power management module 995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 996 and a voltage, current or temperature thereof while the battery is charged. The battery 996 may include, for example, a rechargeable battery or a solar battery.

The indicator 997 may display a specific state of the electronic device 900 or a portion thereof (e.g., the processor 910), such as a booting state, a message state, a charging state, and the like. The motor 998 may convert an electrical signal into a mechanical vibration and may generate the following effects: vibration, haptic, and the like. Even though not illustrated, a processing device (e.g., a GPU) for supporting a mobile TV may be included in the electronic device 900. The processing device for supporting a mobile TV may process media data according to the standards of DMB, digital video broadcasting (DVB), MediaFlo™, or the like.

As described above, according to various example embodiments, an electronic device may include a display module and a processor. The display module may include a display area where at least one pixel is disposed, a non-display area including a test part supplying a test signal to the display area, and a substandard state detection line disposed in at least a portion of the non-display area and including one end connected to the test part and the other end connected to the at least one pixel. Under control of the processor, a data signal for test may be supplied to the test part.

According to various example embodiments, the display module may further include at least one gate driver supplying a test signal to the third conductive line through the test part and a data driver supplying a data signal to the display area.

According to various example embodiments, the processor may control to supply a direct current gate signal to the display area through the test part and to supply a data signal for test to the display area through the data driver.

According to various example embodiments, the processor may be configured to perform control such that the direct current gate signal and the data signal for test are alternately supplied.

According to various example embodiments, the processor may be configured to adjust a period where the direct current gate signal and the data signal for test are supplied.

According to various example embodiments, the processor may be configured to lower a period where the direct current gate signal and the data signal for test are supplied, to a specific magnitude.

According to various example embodiments, the processor may be configured to adjust at least one of a magnitude or a period of at least one of the direct current gate signal or a data signal for test, to allow background luminance of the display area to be lowered to a specific magnitude.

According to various example embodiments, the substandard state detection line may be connected with a data line which is connected with at least one green sub-pixel spaced from a periphery of the display area by a specific distance.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of hardware circuitry, mechanical circuitry, an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various example embodiments of the present disclosure may be, for example, implemented by instructions stored in a computer-readable storage media in the form of a program module. The instruction, when executed by one or more processors (e.g., the processor 12 or 910), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various example embodiments of the present disclosure, and vice versa.

Modules or program modules according to various example embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to various example embodiments, a substandard state occurring at a display module may be detected more easily and accurately, thereby making it possible to restore or maintain the reliability of products.

While the present disclosure has been illustrated and described with reference to various example embodiments, it will be understood by those skilled in the art that various changes in form and details may be made without departing from the spirit and scope of the present disclosure as defined by the appended claims and their equivalents.

What is claimed is:

1. An electronic device, comprising:
    a housing;
    a display module exposed through an opening in at least one side of the housing; and
    a processor disposed in the housing and electrically connected to the display module,
    wherein the display module comprises:
    a display area comprising a plurality of first conductive lines and a plurality of second conductive lines intersecting with the first conductive lines;
    a non-display area at least partially surrounding the display area;
    a test circuitry electrically connected to the first conductive lines; and
    a third conductive line electrically connected between at least one of the first conductive lines and the test circuitry, and wherein the third conductive line includes a portion that is between the one first conductive line and the test circuitry and is disposed in the non-display area and extending along a periphery of the display area, wherein a first end of the third conductive line is electrically connected to the at least one line of the first conductive lines and another end of the third conductive line is electrically connected to the test circuitry.

2. The electronic device of claim 1, wherein the test circuitry comprises switching elements electrically connected to the first conductive lines respectively, and wherein the third conductive line electrically connects at least one of the first conductive lines and one of the switching elements.

3. The electronic device of claim 1, wherein the periphery of the display area comprises a first periphery extending along a first direction in which the first conductive lines extend, and wherein at least a portion of the third conductive line includes a portion that is between the one first conductive line and the test circuitry and is extending along the first periphery.

4. The electronic device of claim 3, wherein the periphery of the display area comprises a second periphery extending along a second direction in which the second conductive lines extend, and wherein at least a portion of the third conductive line includes a portion that is between the one first conductive line and the test circuitry and is extending along the second periphery.

5. The electronic device of claim 1, wherein remaining ones of the plurality of first conductive lines other than the first conductive line connected to the third conductive line extend substantially in parallel and are connected to the test circuitry, and wherein the first conductive line connected to the third conductive line is connected to the test circuitry through the third conductive line.

6. The electronic device of claim 1, wherein the display module further comprises a fourth conductive line electrically connected between another of the first conductive lines and the test circuitry, and wherein the fourth conductive line includes a portion that is between the another first conductive line and the test circuitry and is disposed in the non-display area and extending along a periphery of the display area.

7. The electronic device of claim 6, wherein the third conductive line and the fourth conductive line are respectively formed in different layers.

8. The electronic device of claim 1, wherein the display area comprises at least one of a data line, a gate line, a thin film transistor source, a thin film transistor drain, and a common electrode of a pixel, and wherein the third conductive line is disposed in a layer where at least one of the data line, the gate line, the thin film transistor source, the thin film transistor drain, and the common electrode is formed and is electrically connected to at least one first conductive line disposed at substantially a center area of the display area.

9. The electronic device of claim 1, further comprising at least one of:

a data driver to which the first conductive lines are electrically connected;

at least one gate driver supplying a test signal to the third conductive line through the test circuitry, and wherein the processor is configured to alternately output a data signal of the data driver and the test signal to the display area.

10. The electronic device of claim 1, wherein the processor is configured to supply a specific direct current gate signal and a specific data signal alternately to the third conductive line, and wherein the processor is configured to adjust at least one of a magnitude or a period of at least one of the direct current gate signal or a data signal for test, to provide background luminance of the display area having a specific value.

11. The electronic device of claim 1, wherein a damage of the display module is notified through on an operation of pixels corresponding to the at least one line when the third conductive line is damaged.

12. An electronic device, comprising:

a housing;

a display module exposed through an opening in at least one side of the housing; and a processor disposed in the housing and electrically connected to the display module, wherein the display module comprises:

a display area comprising a plurality of first conductive lines and a plurality of second conductive lines intersecting with the first conductive lines;

a non-display area at least partially surrounding the display area;

a test circuitry electrically connected to the first conductive lines; and a third conductive line electrically connected between one of the first conductive lines and the test circuitry, and wherein the third conductive line includes a portion disposed in the non-display area and extending along a periphery of the display area;

wherein the display area further comprises a plurality of pixels, and wherein the plurality of pixels comprises:

a first pixel connected to one of the first conductive lines; and a second pixel connected to the first conductive line connected with the third conductive line, wherein when the third conductive line is not damaged, the first pixel and the second pixel display substantially a same color and/or luminance, and wherein when the third conductive line is damaged, the first pixel and the second pixel display different colors and/or luminance from each other.

* * * * *